(12) United States Patent
Johnson et al.

(10) Patent No.: US 9,950,400 B2
(45) Date of Patent: Apr. 24, 2018

(54) FABRICATION SYSTEM AND METHOD OF USING THE SAME

(71) Applicants: Joel David Johnson, Pittsburgh, PA (US); Justin Daniel Johnson, Gainesville, FL (US)

(72) Inventors: Joel David Johnson, Pittsburgh, PA (US); Justin Daniel Johnson, Gainesville, FL (US)

(73) Assignee: Kinetigear, LLC, Ocala, FL (US)

( * ) Notice: Subject to any disclaimer, the term of this patent is extended or adjusted under 35 U.S.C. 154(b) by 0 days.

(21) Appl. No.: 14/987,227

(22) Filed: Jan. 4, 2016

(65) Prior Publication Data
US 2016/0193709 A1  Jul. 7, 2016

Related U.S. Application Data

(60) Provisional application No. 62/099,429, filed on Jan. 2, 2015, provisional application No. 62/099,494, filed on Jan. 3, 2015.

(51) Int. Cl.
*B23Q 37/00* (2006.01)
*B23Q 1/01* (2006.01)
(Continued)

(52) U.S. Cl.
CPC ........ *B23Q 37/005* (2013.01); *B23B 31/1177* (2013.01); *B23B 31/201* (2013.01);
(Continued)

(58) Field of Classification Search
CPC ..... Y10T 279/17351; Y10T 279/17444; Y10T 403/535; Y10T 29/50; Y10T 483/17; Y10T 483/1738; Y10T 409/309408; Y10T 409/309576; Y10T 409/308288; Y10T 409/307728; Y10T 408/91; Y10T 409/30448; Y10T 409/309296; Y10T 279/23; B23Q 1/62; B23Q 37/002; B23Q 37/005; B23Q 1/621; B23Q 1/626; B23Q 1/01; B23Q 1/012; B23Q 1/015;
(Continued)

(56) References Cited

U.S. PATENT DOCUMENTS

| 299,886 A | * | 6/1884 | Westbrook ............ B23B 31/026 |
| | | | 279/43.5 |
| 3,587,387 A | * | 6/1971 | Burrows et al. ...... B23B 31/207 |
| | | | 310/50 |

(Continued)

FOREIGN PATENT DOCUMENTS

| CN | 203371791 U | * | 1/2014 |
| DE | 202013010264 U1 | * | 3/2014 |
| JP | 61-164738 A | * | 7/1986 |

*Primary Examiner* — Erica E Cadugan
(74) *Attorney, Agent, or Firm* — Cohen & Grigsby, P.C.

(57) ABSTRACT

A fabrication system may generally comprise an x-y positioning assembly, a clamping head to receive an end effector, wherein the clamping head is coupled to the x-y positioning assembly, a z positioning assembly, a platform including a surface that is rigid and substantially planar, wherein the platform is coupled to the z positioning assembly, and a controller operably coupled to the x-y positioning assembly, end effector, z positioning assembly, and platform. Methods of using the fabrication system are also described.

20 Claims, 13 Drawing Sheets

(51) Int. Cl.
    B23Q 1/62      (2006.01)
    B23P 23/04     (2006.01)
    B23C 1/00      (2006.01)
    B23B 31/10     (2006.01)
    B23B 31/28     (2006.01)
    B23B 39/00     (2006.01)
    B23K 37/02     (2006.01)
    B29C 67/00     (2017.01)
    F16D 1/08      (2006.01)
    B23B 31/117    (2006.01)
    B23B 31/20     (2006.01)
    B29C 64/20     (2017.01)
    B33Y 30/00     (2015.01)

(52) U.S. Cl.
    CPC ............ *B23B 39/006* (2013.01); *B23C 1/002* (2013.01); *B23K 37/0241* (2013.01); *B23P 23/04* (2013.01); *B23Q 1/012* (2013.01); *B23Q 1/015* (2013.01); *B29C 64/20* (2017.08); *F16D 1/0864* (2013.01); *B23B 31/28* (2013.01); *B23Q 1/62* (2013.01); *B33Y 30/00* (2014.12); *Y10T 29/50* (2015.01); *Y10T 279/17351* (2015.01); *Y10T 279/17444* (2015.01); *Y10T 279/23* (2015.01); *Y10T 403/535* (2015.01); *Y10T 409/307728* (2015.01); *Y10T 409/309296* (2015.01); *Y10T 483/17* (2015.01); *Y10T 483/1738* (2015.01)

(58) Field of Classification Search
    CPC ....... B23Q 1/017; F16D 1/0864; B23C 1/002; B23C 1/06; B23B 39/006
    USPC ......... 279/43.5, 46.5, 128; 403/290; 29/560; 483/16, 32; 409/235, 212, 202, 230, 144, 409/231–234; 408/234
    See application file for complete search history.

(56) References Cited

U.S. PATENT DOCUMENTS

| | | | | |
|---|---|---|---|---|
| 4,614,137 | A * | 9/1986 | Jones | B23B 31/00 279/128 |
| 4,987,668 | A * | 1/1991 | Roesch | B23C 1/002 409/145 |
| 5,911,888 | A * | 6/1999 | Girardin | B23H 1/00 219/69.11 |
| 5,933,933 | A * | 8/1999 | Fritz | B23Q 1/03 29/33 P |
| 6,364,818 | B1 * | 4/2002 | Chen | B23Q 1/56 29/27 R |
| 6,798,088 | B2 * | 9/2004 | Hsu | B23Q 1/012 310/12.13 |
| 7,625,198 | B2 * | 12/2009 | Lipson | B29C 67/0055 425/169 |
| 7,766,586 | B2 * | 8/2010 | DeRosa | B23B 31/103 279/43.1 |
| D629,016 | S * | 12/2010 | Brooks | D15/5 |
| 8,632,283 | B2 * | 1/2014 | Yoshida | B23Q 1/4819 408/234 |
| 2006/0270540 | A1 * | 11/2006 | Takayama | B23Q 1/012 483/41 |
| 2010/0202848 | A1 * | 8/2010 | Tanizaki | B23Q 1/015 409/134 |
| 2014/0319785 | A1 * | 10/2014 | Chen | B23B 31/201 279/43.5 |

* cited by examiner

Controller Operably Coupled to the X-Y Positioning Assembly, End Effector, Z Positioning Assembly, and Platform

FIG. 12

Module Including at Least One Magnet to Magnetically Couple to the End Effector

FIG. 13

End Effector Comprising At Least One of Bits, Lenses, Pipettes, Suction Cups, Blades, Stamps, Shears, Electric Discharge End Effector, Cutters, and Nozzles

FIG. 14

End Effector Configured for At Least One of Cutting, Shaping, Drilling, Grasping, Suctioning, Layering of Liquids, Spraying, Placing, Viewing, Curing. Welding, Engraving, Ablation, Extraction, and Embossing

FABRICATION SYSTEM AND METHOD OF USING THE SAME

CROSS-REFERENCE TO RELATED APPLICATIONS

This application claims the benefit of U.S. Provisional Application No. 62/099,429 filed on Jan. 2, 2015, which is hereby incorporated herein by reference in its entirety. Additionally, attention is directed to U.S. Provisional Application No. 62/099,494, filed on Jan. 3, 2015, which is hereby incorporated herein by reference in its entirety.

FIELD OF INVENTION

The present inventions generally relate to fabrication systems and methods of using the same.

BACKGROUND

Fabrication laboratories may generally comprise a suite of fabrication machines for rapid prototyping and computer-based design. The fabrication machines may include laser engravers, computer or computerized numerical control machines, 3D printers and scanners, and electronic cutters, for example. Many consumers may not be able to afford a suite of fabrication machines and/or may lack the space for a suite of fabrication machines. Accordingly, more efficient and/or cost-effective fabrication systems and methods of using the same may be desirable.

SUMMARY

In various embodiments, more efficient and/or cost-effective fabrication systems and methods of using the same are described.

In various embodiments, a fabrication system may generally comprise a two axis gantry system, a movable clamping head (5) having a first side (6) and a second side (7), an interchangeable end effector (10), and a 3D printing bed (15). The clamping head (5) may comprise a void (21) between the first side (6) and second side (7). The clamping head (5) may comprise a washer (22) and a bolt (23). The fabrication system may comprise a compressing handle (20). The compressing handle (20) may comprise an oval-shaped end (24). The compressing handle (20) may comprise an offset internal axis (25). The fabrication system may comprise a milling plate (30). The milling plate (30) may comprise at least one dome-headed screw (34). The milling plate (30) may comprise at least one compression spring (35). The at least one dome-headed screw (34) may cooperate with the at least one compression spring (35) to level the tension of the milling plate (30). The 3D printing bed (15) may comprise a magnetic concave coupler (40). The 3D printing bed (15) may comprise a tension access hole (45).

DESCRIPTION OF FIGURES

The embodiments described herein may be better understood by reference to the accompanying figures, in which.

DETAILED DESCRIPTION

All numerical quantities stated herein are approximate, unless indicated otherwise, and are to be understood as being prefaced and modified in all instances by the term "about". The numerical quantities disclosed herein are to be understood as not being strictly limited to the exact numerical values recited. Instead, unless indicated otherwise, each numerical value included in this disclosure is intended to mean both the recited value and a functionally equivalent range surrounding that value.

All numerical ranges recited herein include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value equal to or less than 10.

As generally used herein, the articles "one", "a", "an", and "the" include "at least one" or "one or more" of what is claimed or described, unless indicated otherwise. For example, "a component" means one or more components, and thus, possibly, more than one component is contemplated and may be employed or used in an implementation of the described embodiments.

As generally used herein, the terms "include", "includes", and "including" are meant to be non-limiting.

As generally used herein, the terms "have", "has", and "having" are meant to be non-limiting.

In general, the consumer market for fabrication devices may include four broad groups of users: hobbyists, institutional users, professional users, and small business users. Conventional fabrication devices may be problematic for hobbyists that desire a device that fits in their space, maximizes the utility of their space, and/or is intuitive to use. Conventional fabrication devices may be problematic for institutional users that also desire a device that limits the time and cost associated with training and/or provides efficient transition among multiple fabrication methods. Conventional fabrication devices may be problematic for professional users that also desire a device that retains dimensional stability to build objects with reliability and precision. Conventional fabrication devices may be problematic for small business users that also desire a device that scales to demand.

Conventional fabrication devices may include single use CNC machines configured for one fabrication modality. Single use CNC machines may have a low ratio of utility to space because only a single fabrication method is provided.

Conventional fabrication devices may also include multiple use CNC machines configured for more than one fabrication modality. The multiple use CNC machines may include an integrated gantry design having multiple modalities integrated into the gantry. The integrated gantry design may be problematic because the modalities may interfere with each other and/or materials, the working volume may be limited by the number of modalities integrated on the gantry, the platform may be limited by the type of modalities or vice versa, debris from one modality may contaminate/damage other modalities, and/or the number of modalities may be limited by the gantry.

In various embodiments, a fabrication system may generally comprise a platform, an end effector, an x-y-z positioning assembly, and a controller that cooperate to fabricate an object within a working volume of the system. The fabrication system may be configured to allow rapid interchange between end effectors. The fabrication system may be configured to allow rapid installation and removal of the 3D printing bed onto a milling plate, and precision leveling of the 3D printing bed.

In various embodiments, a fabrication system may comprise more than one modality. The modality may include, for example, bits, lenses, pipettes, suction cups, blades, stamps, shears, electric discharge, hot cutters, and nozzles. The modality may be configured for cutting, shaping, drilling, grasping, suctioning, layering of liquids/resins/plastics, or spraying, or placing, viewing, precision curing, welding, engraving, ablation, extraction, and/or embossing, for example. Each modality may have associated hardware, e.g., cooling, circuitry, chucks, motors, vacuum, lenses, lighting, adjustability and/or level of force to build the object that may be the same or different from the other modalities.

In various embodiments, the fabrication system may comprise a rapid-change, spring loaded build-platform associated with one or more of the modalities. The user may change the platform when changing among modalities. For example, the platform associated with a 3D printer modality may comprise a smooth, contiguous platform, while the platform associated with a milling modality may comprise a jig plate to mount jigs, fixtures, and sacrificial plates. A sacrificial plate may be configured to allow a bit to dig past outer boundary of cut material without cutting into platform. The sacrificial plate may become scarred and may be replaced. The platform may be spring-loaded for leveling and magnetically coupled to the milling plate. The milling plate may be fixed to the z-axis platform such that it may endure more force when used.

In various embodiments, the fabrication system may comprise a swap gantry design. The swap gantry design may maintain centrality of the end effector, prevent or reduce additive errors, and/or maintain the desired z-height for the modalities. The gantry may comprise a single piece of cylindrical material that covers all or substantially all of the outer surface area of the rapid change attachment. The cylindrical receptacle, i.e., the compression clamp, which receives the module may maintain the centrality of the end effector equidistance from the boundaries of the clamp. The receptacle may be configured to maintain the z-height of the module instead of maintaining the z-height via computer or platform control. The module may be positioned in the receptacle at the desired z-height, and the gantry's clamp may be secured to hold the module in place. The unitary construction of the receptacle may prevent or reduce additive errors associated with conventional devices comprising multiple pieces. The lack of components on the gantry typically found in conventional devices may prevent or reduce opportunities for wear and tear. The unitary construction of the gantry may maintain the module in direct contact with the cross constraint of the actuation.

In various embodiments, a fabrication system may generally comprise a platform, an end effector, an x-y-z positioning assembly, and a controller that cooperate to fabricate an object within a working volume of the device. The fabrication system may be configured to allow rapid interchange between end effectors. The fabrication system may be configured to allow rapid installation and removal of the 3D printing bed onto a milling plate, and precision leveling of the 3D printing bed.

The platform may include a surface that is rigid and substantially planar. The surface may provide a fixed, dimensionally and positionally stable platform on which to build the object.

The x-y-z positioning assembly may generally be adapted to three-dimensionally position the end effector within the working volume. The x-y-z positioning assembly may comprise an x-y positioning assembly and a z positioning assembly. The x-y-z positioning assembly may, for example, include a number of stepper motors to independently control a position of the end effector along each of an x-axis, y-axis, and z-axis. More generally, the x-y-z positioning assembly may include, without limitation, various combinations of stepper motors, encoded DC motors, gears, belts, pulleys, worm gears, threads, and so forth. Any such arrangement suitable for controllably positioning the end effector within the working volume may be adapted to use with the system described herein.

The controller may be electrically coupled to the platform, x-y-z positioning assembly, end effector, and other components of the system. In general, the controller may be operable to control the components of the system, such as the platform, x-y-z positioning assembly, end effector, and other components of the device described herein to fabricate the object from the build material. The controller may include any combination of software and/or processing circuitry suitable for controlling the components of the system described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like.

Figure 1:
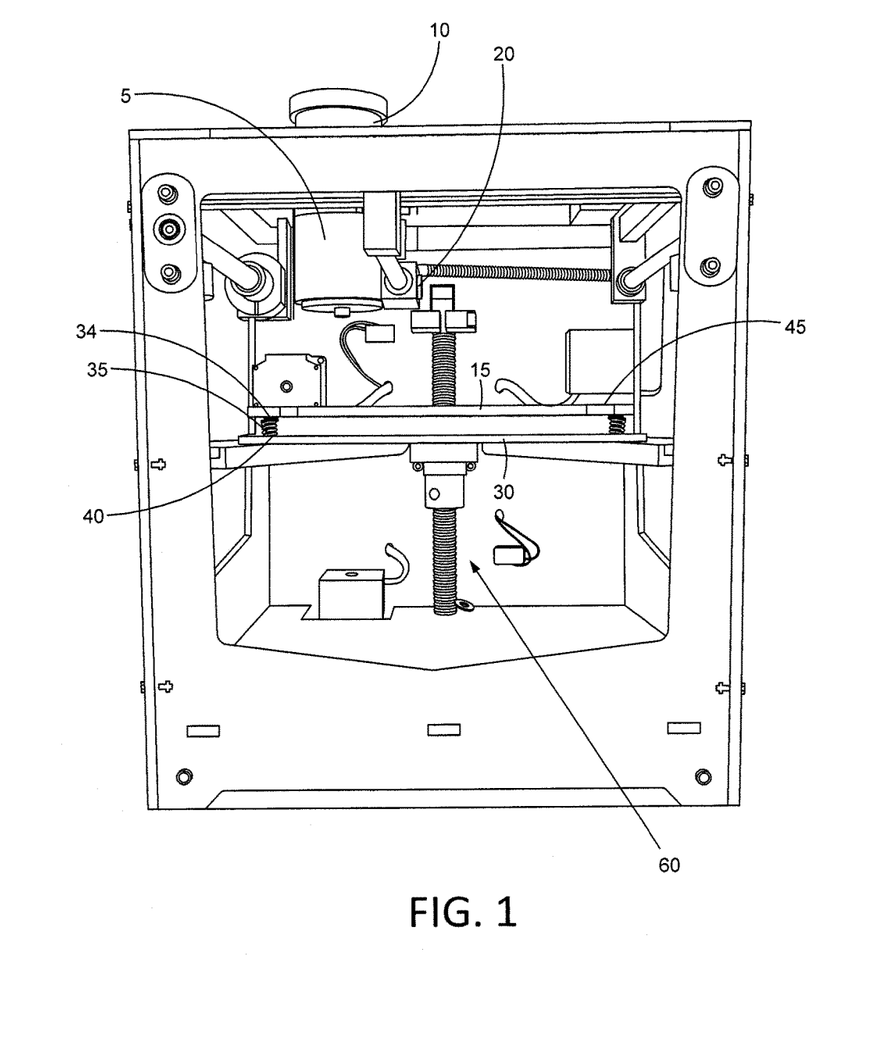
FIG. 1 includes a front view of a fabrication system according to various embodiments.
Figure 2:
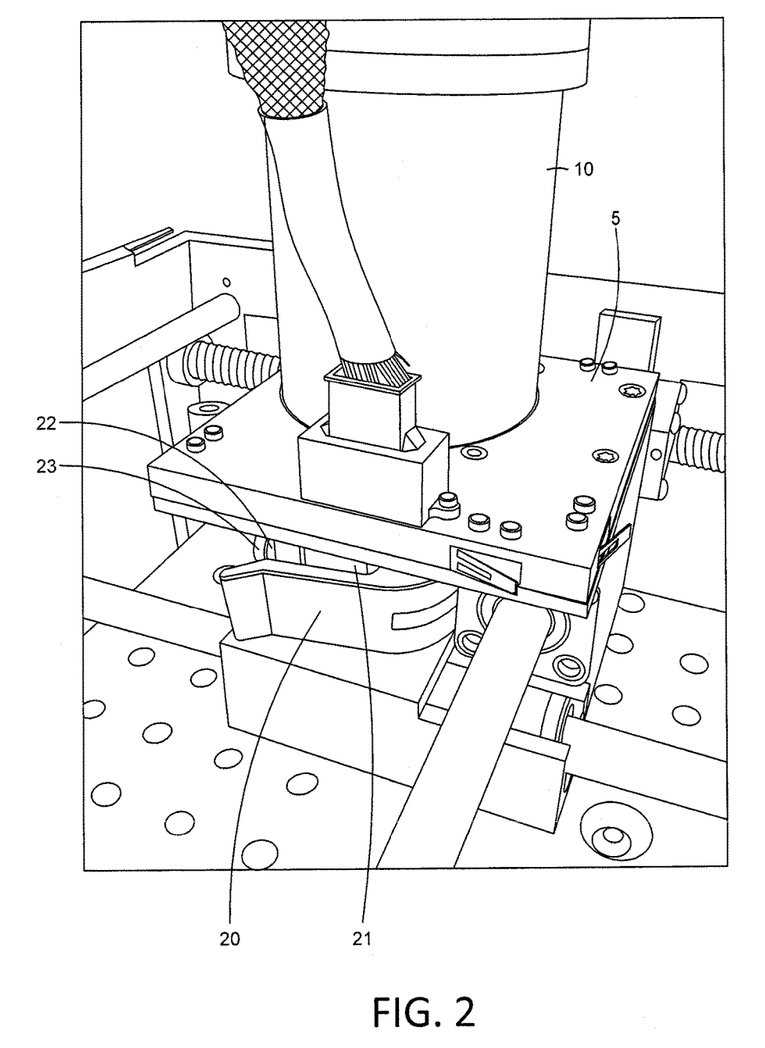
FIG. 2 includes a movable clamping head (5) having an interchangeable end effector (10) according to various embodiments.
Figure 3:
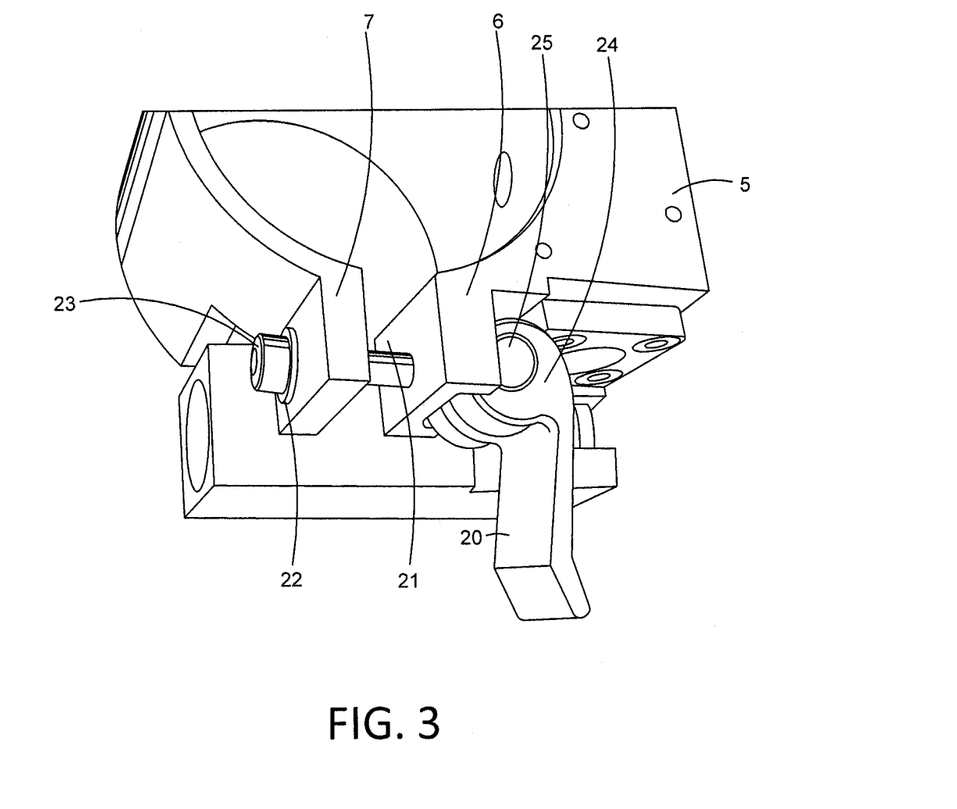
FIG. 3 includes a fabrication system having a movable clamping head (5) without an interchangeable end effector (10) according to various embodiments.
Figure 4:
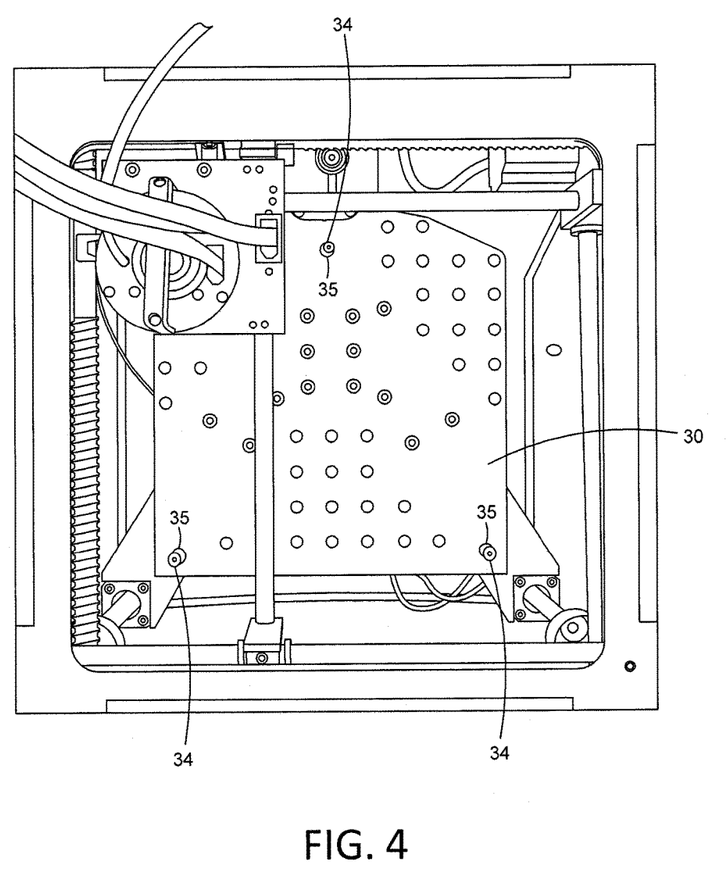
FIG. 4 includes a top view of a fabrication system comprising a milling plate (30) without the 3D printing bed (15) according to various embodiments.

Referring to FIGS. 1-7, a fabrication system may comprise a movable clamping head (5) having a compressing handle (20) configured to allow a user to rapidly install or remove different end effectors (10). The compression of the movable clamping head (5) may be modulated by the compressing handle (20). As shown in FIG. 3, the oval-shaped end (24) of the compressing handle (20) may have an offset internal axis (25) around which the compressing handle (20) pivots. Without wishing to be bound to any particular theory, the offset internal axis (25) may unevenly distribute the surrounding material within the oval-shaped end (24). When the handle (20) is opened, there may be less material between the offset internal axis (25) and a first side (6) of the clamping head (5). When the compressing handle (20) is closed, the larger portion of the oval-shaped end (24) may pivot towards the first side (6) of the clamping head (5). Then, the first side (6) of the clamping head (5) may compress towards a second side (7) of the clamping head (5). The first side (6) of the clamping head (5) may be held in place by a bolt (23) and a washer (22). When the first side (6) of the clamping head (5) compresses against the second side (7) of the clamping head (5), a void (21) therebetween may close to allow an end effector (10) to be held tightly in place upon installation (as shown in FIG. 2) and/or more easily removed when the compressing handle (20) is opened.

Figure 5:
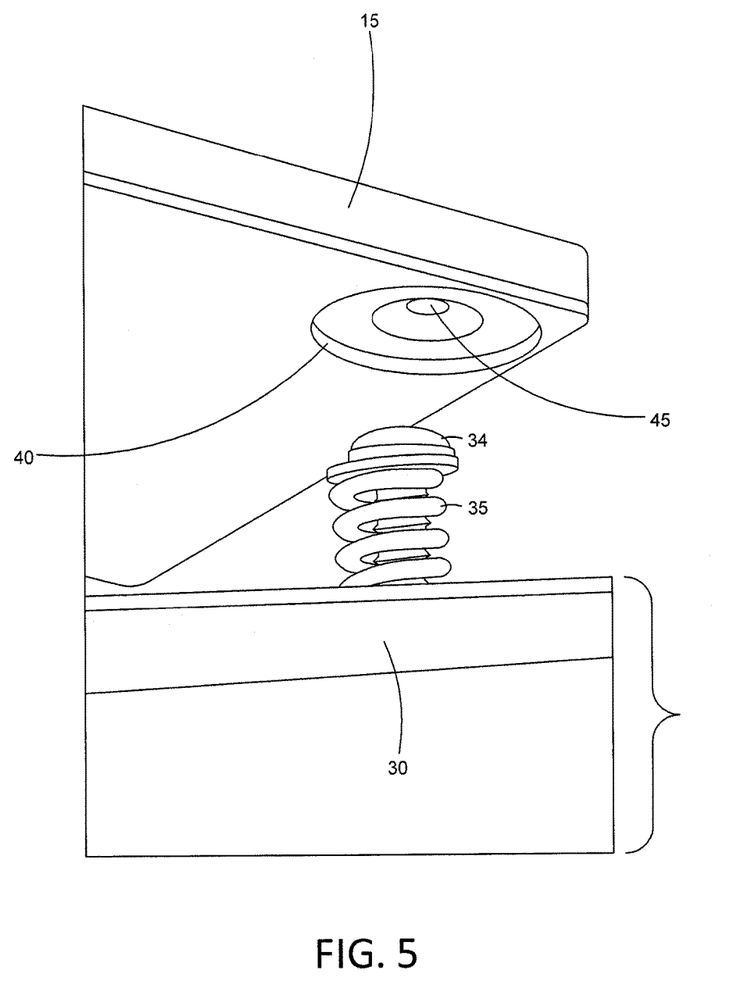
FIGS. 5 and 6 include a milling plate (30) and a 3D printing bed (15) according to various embodiments.
Figure 6:
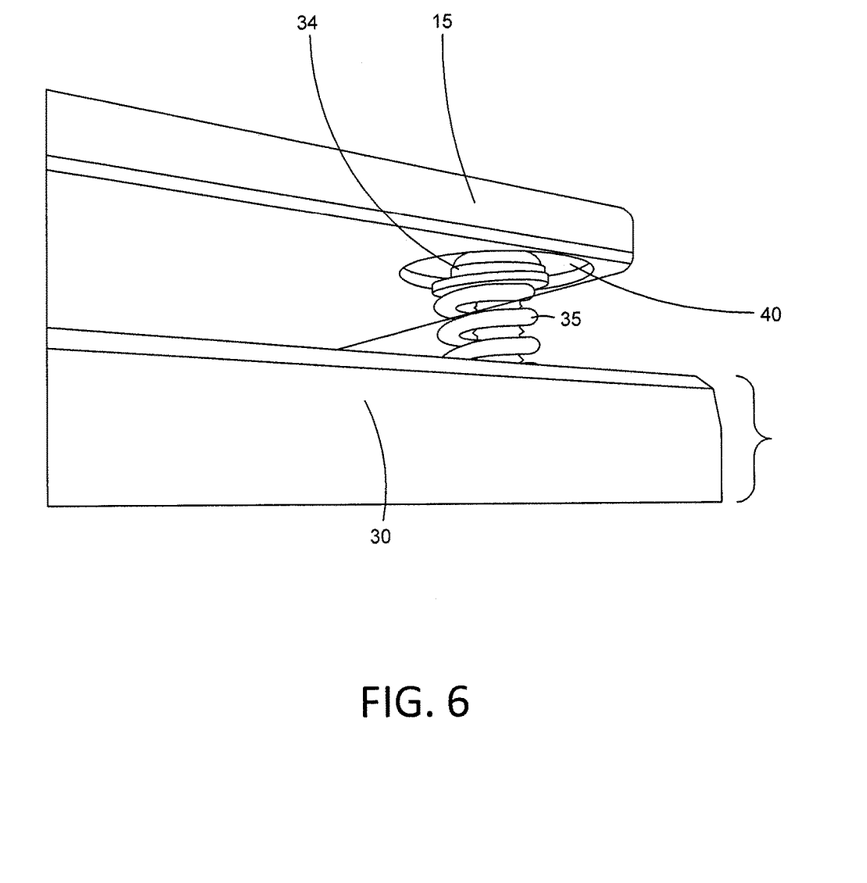

Referring to FIGS. 5 and 6, the underside of the 3D printing bed (15) may comprise at least one, such as 1-10, preferably 1, 2, or 3, magnetic couplers (40) spaced around the perimeter to rapidly attach the 3D printing bed (15) to the milling plate (30) by attaching to corresponding screws (34) on the milling plate (30). The magnetic couplers (40) may have a concave shape. The screws (34) may have domed heads. The domed heads may fit snugly within the concave shape of the magnetic couplers (40). The concave shape of the magnetic couplers (40) and the domed head of the screw (34) may be configured to ensure that the magnetic couplers (40) remain geometrically central on the axes of the screw (34). Without wishing to be bound to any particular theory, one or more of these features may work together to allow for rapid installation and removal of the 3D printing bed (15) while maintaining a secure bond between the milling plate (30) and 3D printing bed (15) when it's installed.

The milling plate (30) may comprise at least one, such as 1-10, and preferably 1, 2, or 3, compression spring (35) that encase corresponding screws (34). The at least one compression spring (35) may be affixed to the milling plate (30), around its perimeter. The screws (34) may have domed heads. The head of the screw (34) may constantly compresses the spring (35) that coils around the screw's shaft by stabilizing the screw's (34) external threading against the internal threading of the nut that holds it within the milling plate (30). The constant compression may eliminate or reduce undesirable movement caused by space between the internal threading of the screw (34) and the external threading of the nut, to provide a stable and precise means of leveling the 3D printing bed (15).

Figure 7:
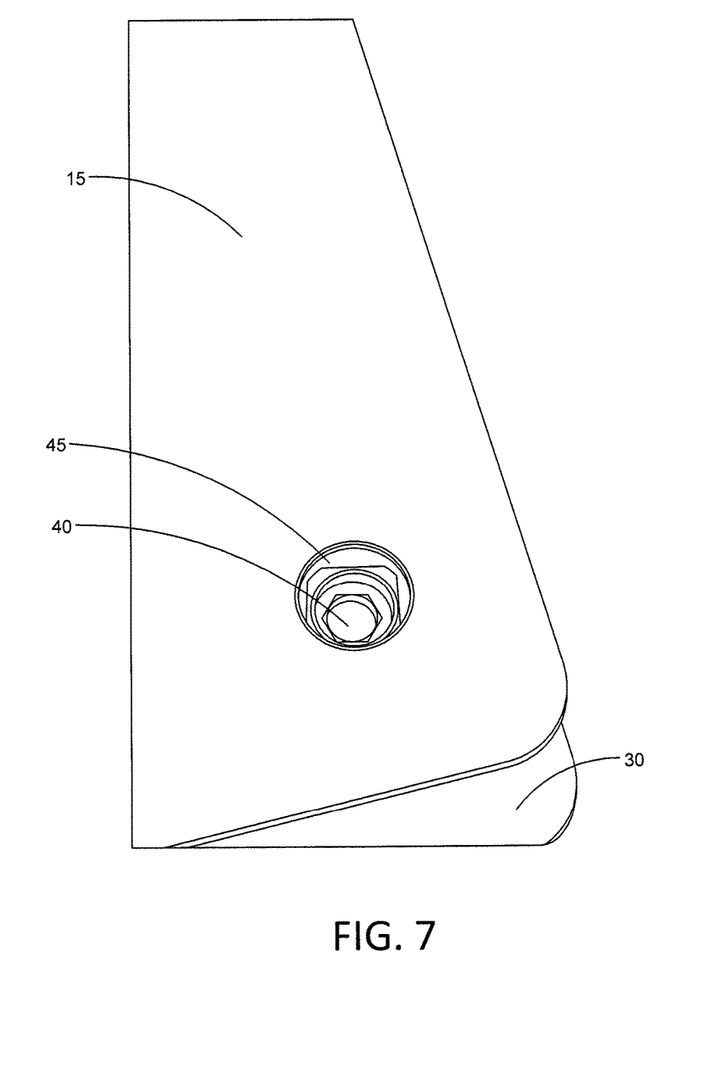
FIG. 7 includes a 3D printing bed (15) according to various embodiments.

Referring to FIG. 7, a user may insert a hex key into the tension access hole (45) atop the magnetic coupler (40) and may turn the screw (34) counter-clockwise to level the 3D printing bed (15). The spring (35) may continue to push up on the screw's (34) head, which, in turn, may raise the 3D printing bed (15).

Generally, conventional end effectors may typically only have one function, or may be difficult to change for additional functions. Conventional end effectors may lack quick methods to change out the functional components on the end effector, and adding capabilities may use additional parts or components that are bolted to the outside of the end effector. When the end effector is changed, it may use special tools and it may be desirable to reset the placement of the end effector. Conventional end effectors may lack internal passages for wiring, or ducting for the purpose of moving fluids to or away from the object being created or affected.

In various embodiments, the fabrication system may comprise an end effector. The end effector may be removably and replaceably coupled to the system described above. The end effector may be slidably coupled within a housing to slide parallel to the z-axis. The end effector may be aligned with the z-axis when placed in the housing for use in the system. The housing may be coupled to the x-y-z positioning assembly. A portion of a z positioning assembly 60 is shown in FIG. 1. The housing may comprise one or more magnets to magnetically couple to the end effector. Although various specific mechanical features are described below for modular operation, it will be understood that any features or techniques that may be used to securely couple the end effector to the derive in a manner capable of resisting displacement by opposing forces related to building the object, while being readily removed and replaced may be suitably employed in the housing and other components of the end effector.

Figure 8:
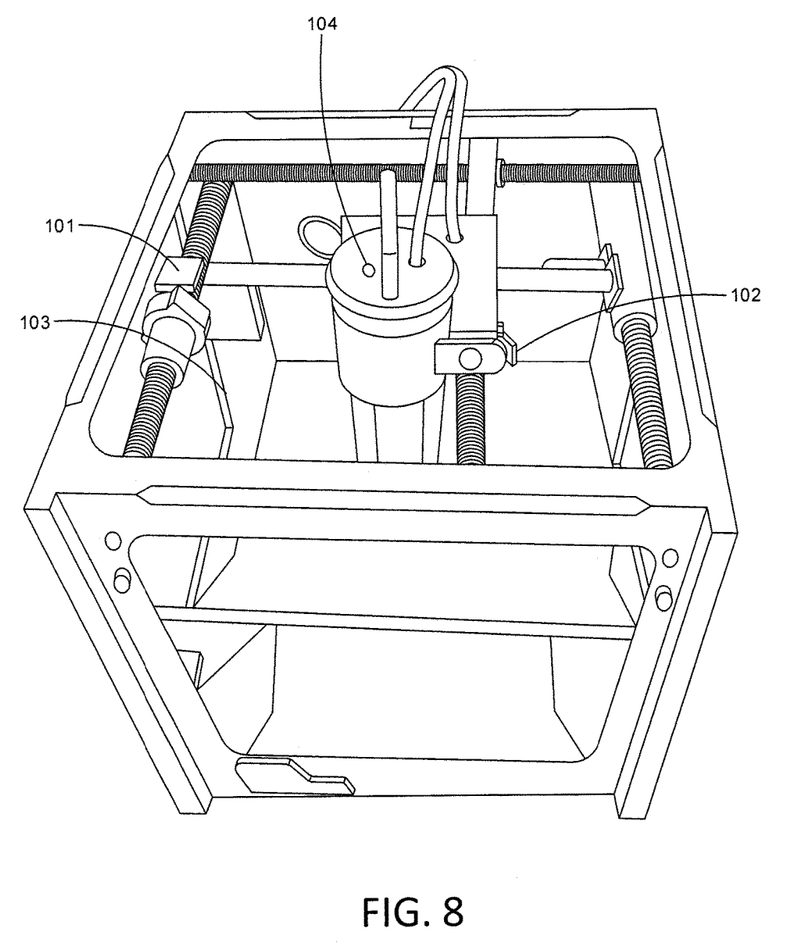
FIG. 8 includes a fabrication system comprising an end effector according to various embodiments.

In various embodiments, the end effector may comprise a self-centering, cylindrical interchangeable end effector. The end effector may be clamped in place and may comprise internal passages for wiring or ducting. Referring to FIG. 8, an end effector (102) may be positioned in a movable clamping head (101) that clamps around the circumference of the cylinder. The head may comprise a clamping device (103) to clamp to the exterior of the end effector (102). The end effector may comprise a cylindrical end effector. The end effector may be configured to allow multiple different types of functioning end effectors to be quickly taken out and swapped, then secured in place. The end effector (102) may comprises internal passages and/or ducting (104) for fluid movement toward and away from the object being created or affected. The end effector (102) may comprise centered internal mountings for the functioning components that allow the end effector to interact with the outside environment. The end effector (102) may maintain the same position of the end effector after the interchange process and/or may not require repositioning the head after a different end effector has been installed.

Conventional combined two axis gantry systems may not allow components in the head to be placed vertically, in reference to the system and through the entire system, without interfering with the movement of the supporting and modulating components. Conventional systems may lack a void to place components into so that components may be mounted through the head; the head may mount above or below the system, and connections may run off to the side of the system, under or above the plane. Conventional systems may be too complicated, with too many components, and/or may not remain stable under heavy load. Conventional systems typically comprise motors and other actuating components to ride on other moving components of the system, with wiring and motors made to follow each movement and unable to remain mounted stationary upon supporting framework.

Figure 9:
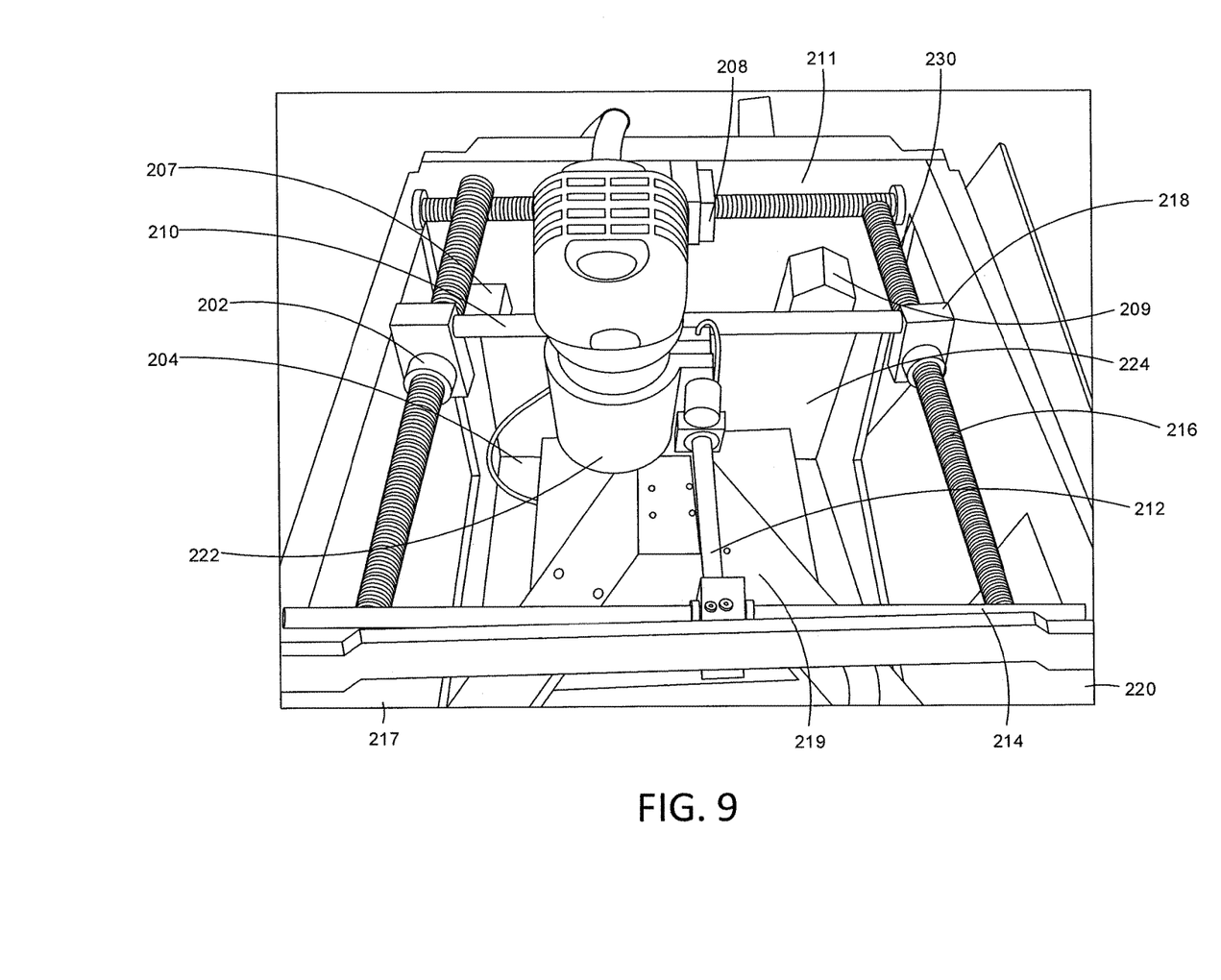
FIGS. 9 to 11 include a fabrication system comprising a two axis gantry system according to various embodiments.
Figure 10:
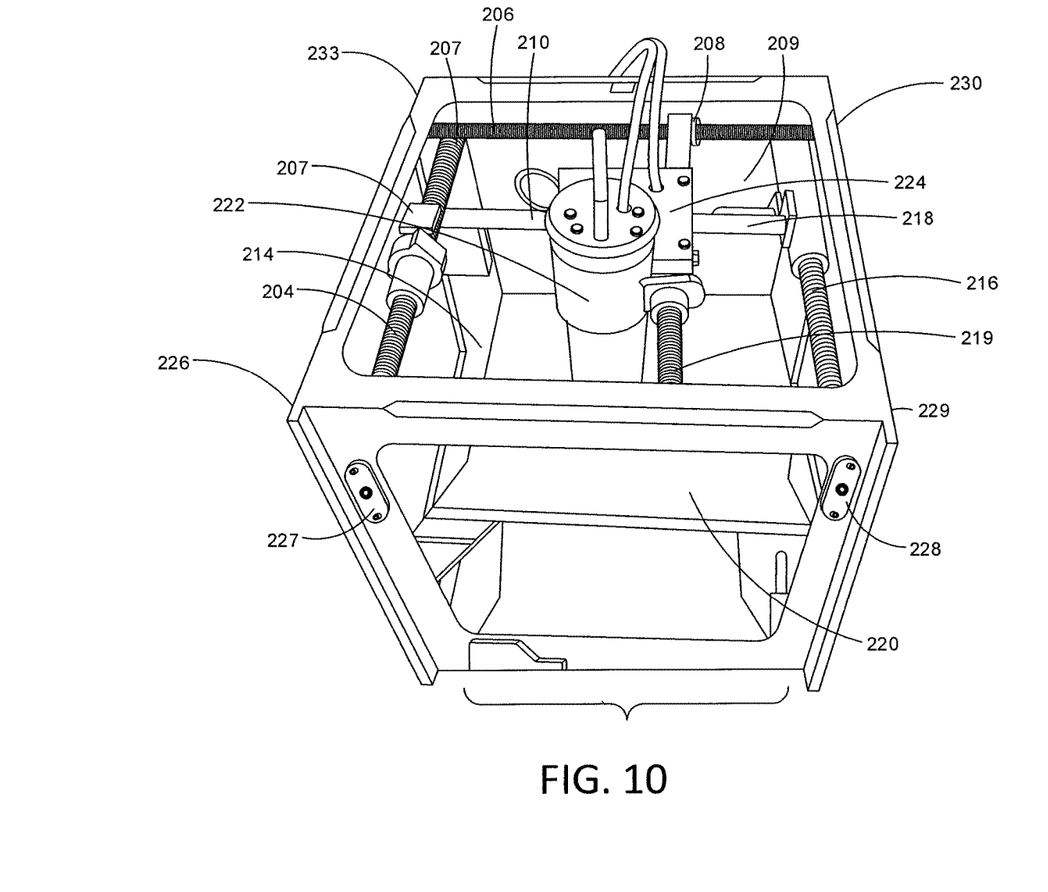
Figure 11:
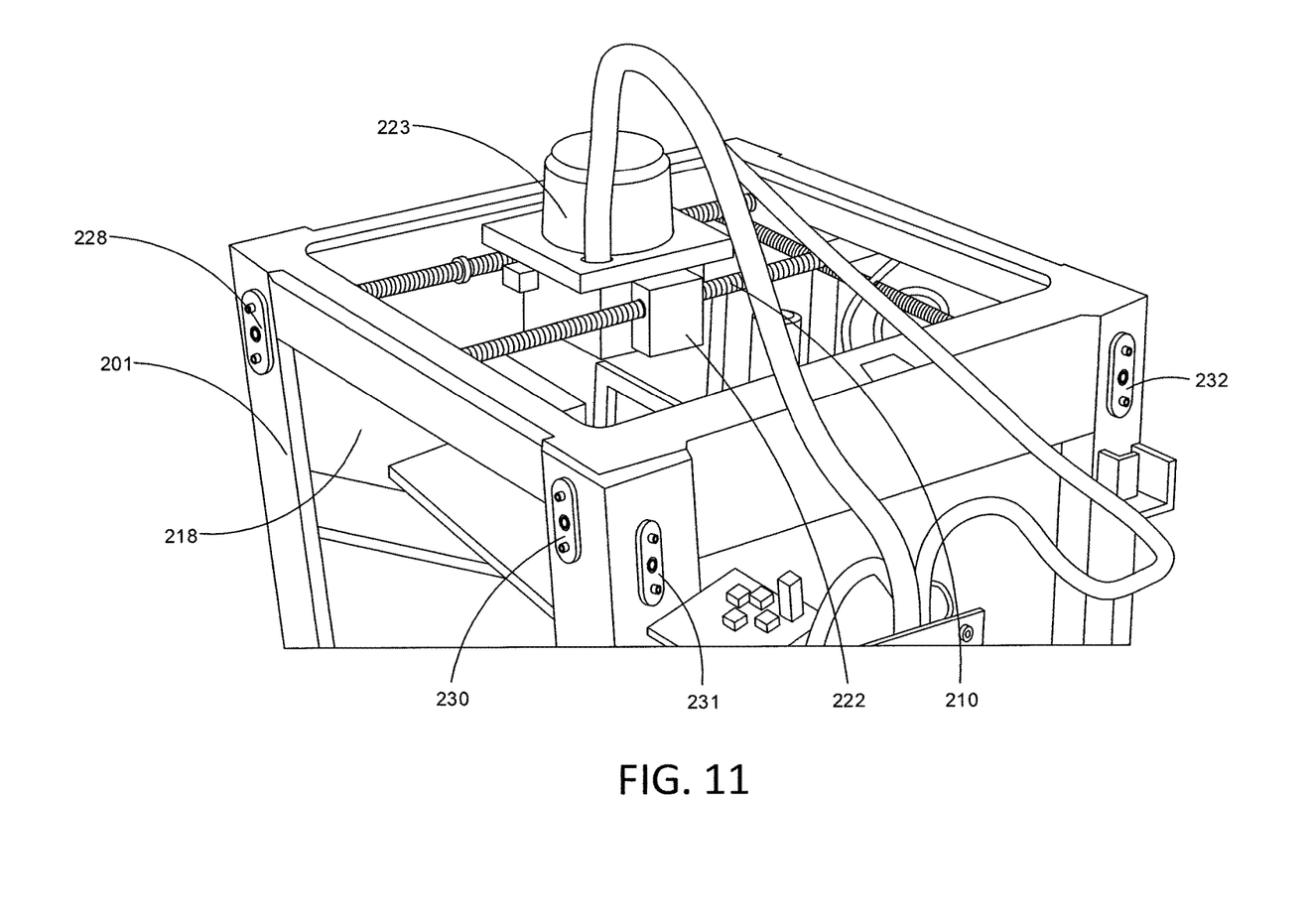
Figure 12:
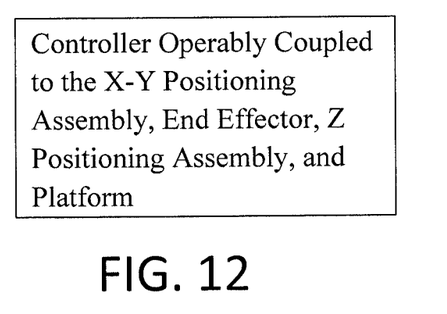
FIG. 12 schematically depicts a controller.
Figure 13:
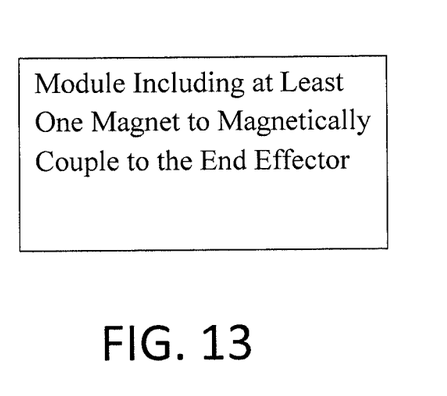
FIG. 13 schematically depicts a feature of the present invention.
Figure 14:
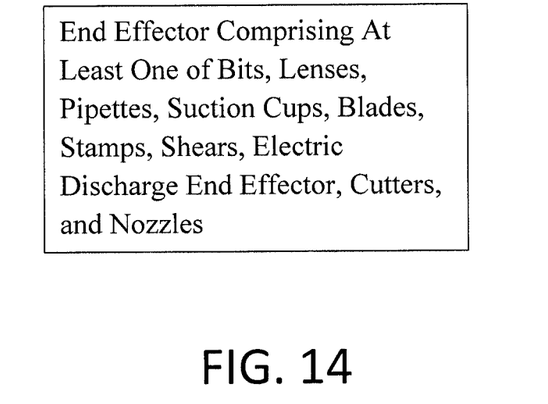
FIGS. 14-15 schematically depict end effectors.
Figure 15:
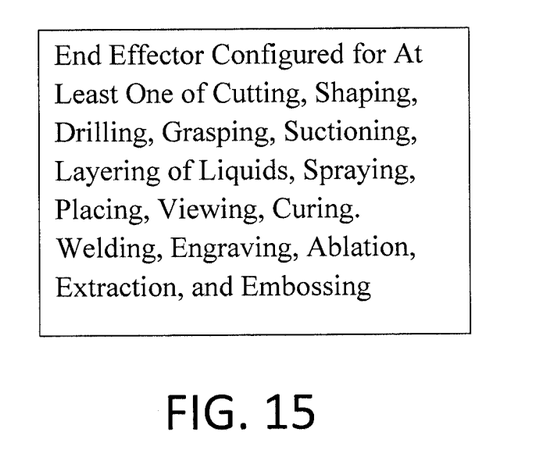

In various embodiments, a fabrication system may comprise an interior convergent-point constrained gantry that may be actuated along the semi-perimeter of movement by supporting components. Referring to FIGS. 9-11 a coordinate-based gantry system, where the location and movement of the head (222) may be defined by the convergent point (224) between linear guides (210, 212), which overlap on parallel planes. The point of convergence (224) may be defined by the movement of nuts (202, 208) along ball-screws or lead-screws (204, 206) that may be placed on intersecting axes on the semiperimeter of the head's movement. The system may be actuated along the semiperimeter by nuts (202, 208) that may be moved and supported by two threaded linear actuators (204, 206) that double as primary load bearing components for the head. The ball-screws or lead-screws (204, 206) may be supported and constrained on parallel planes at their ends by bearings and/or bushings (227, 232, 230, 233), which may be mounted in the frame (201). The nuts (202, 208) may be connected by brackets (203, 205) to the intersecting linear guides (210, 212), where the angle of connection and, thereby, intersection of the internal linear guides (210, 212) may be constrained by the brackets (203, 205) that connect the nuts (202, 208) to the overlapping interior linear guides (210, 212). The threaded linear actuators (204, 206) may be coupled to and turned by motors (207, 209), which may be mounted to the frame (201). The head (222) may maneuver on the interior intersecting linear guides (210, 212) via bearings and/or bushings (221, 223), where the angle of intersection may be further constrained by the location of the bearings and/or bushings (221, 223) in or on the head (222). Vertical movements of the intersecting linear guides (210, 212), and thereby the head (201), relative to the layout of the system, may be constrained by mounting brackets (218, 220) that hold bearings and/or bushings (217, 219) that ride on additional linear guides (214, 216), which may be placed on the opposing semi-perimeter of the head's movement to the threaded actuators (204, 206). The linear guides (214, 216) may be placed on the opposing semiperimeter to the ball-screws or lead-screws (204, 206) to offer additional load bearing support for the head and may be themselves supported and constrained on parallel planes with intersecting axes to each-other by the frame (201) at their end points (226, 229, 228, 231).

A variety of additional components may be usefully incorporated into the system described herein. The additional components may be generically depicted as hardware in accompanying drawing figures, for which the positioning and mechanical/electrical interconnections with the system described herein may be readily understood by a person having ordinary skill in the art.

Many of the systems, devices, and methods described herein may be achieved in hardware, software, or any combination of these suitable for the control, data acquisition, and data processing described herein. This includes devices comprising one or more microprocessors, microcontrollers, embedded microcontrollers, programmable digital signal processors or other programmable devices or processing circuitry, along with internal and/or external memory, any of which may serve as the controller described above or supplement processing of the controller with additional circuitry. This may also, or instead, include one or more application specific integrated circuits, programmable gate arrays, programmable array logic components, or any other device(s) that may be configured to process electronic signals. The devices and processes described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

In other embodiments, computer program products may generally comprise computer-executable code or computer-usable code that, when executing on one or more computing devices (such as the devices/systems described above), perform any and/or all of the steps described above. The code may be stored in a computer memory, which may be a memory from which the program executes (such as random access memory associated with a processor), or a storage device such as a disk drive, flash memory or any other optical, electromagnetic, magnetic, infrared or other device or combination of devices. The processes described above may be embodied in any suitable transmission or propagation medium carrying the computer-executable code described above and/or any inputs or outputs from same.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments have been illustrated and described, it would be obvious to those skilled in the art that various other changes and modifications can be made without departing from the spirit and scope of the invention. Those skilled in the art will recognize, or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

What is claimed is:

1. A fabrication system comprising:
an x-y positioning assembly;
a clamping head to receive a module comprising an end effector, wherein the clamping head is coupled to the x-y positioning assembly;
a z positioning assembly;
a platform including a surface that is rigid and substantially planar, wherein the platform is coupled to the z positioning assembly; and
a controller operably coupled to the x-y positioning assembly, end effector, z positioning assembly, and platform;
wherein the clamping head comprises a compressing handle to couple the module to the clamping head when the compressing handle is in a closed position to secure the module in the clamping head, and
wherein the compressing handle comprises
a handle end, and
an oval-shaped end having a longitudinal central axis and a pivot axis,
wherein the pivot axis is parallel to the longitudinal central axis of the oval-shaped end, and
wherein the pivot axis is offset from the longitudinal central axis of the oval-shaped end.

2. The system of claim 1, wherein the x-y positioning assembly comprises a first linear guide and a second linear guide, wherein the first linear guide is perpendicular to the second linear guide, and wherein the first linear guide and second linear guide overlap.

3. The system of claim 1, wherein the clamping head maintains the module in direct contact with an inner surface of the clamping head.

4. The system of claim 1, wherein the module comprises at least one magnet to magnetically couple to the end effector.

5. The system of claim 1, wherein the clamping head comprises
a clamping head portion having: an annular receptacle, a first side, a second side, and a void between the first side and the second side, wherein the first side and second side are bored to receive a bolt, wherein the first side compresses towards the second side to reduce a size of the void when the module is received by the clamping head and the compressing handle is in the closed position.

6. The system of claim 5, wherein the first side compresses towards the second side to completely close the void therebetween when the module is received by the clamping head and the compressing handle is in the closed position.

7. The system of claim 5, wherein the clamping head portion comprises a single piece and does not comprise multiple pieces.

8. The system of claim 5, wherein an outer surface of the module directly contacts an inner surface of the receptacle.

9. The system of claim 1, wherein the clamping head comprises a longitudinal central axis, and the module comprises a longitudinal central axis and wherein the module comprises a self-centering, cylindrical interchangeable module such that the longitudinal central axis of the module is aligned with the longitudinal central axis of the clamping head.

10. The system of claim 9, wherein the module is slidably coupled parallel to the clamping head's longitudinal central axis.

11. The system of claim 9, wherein the end effector is a first end effector having a longitudinal central axis, and the system further comprising a second end effector having a longitudinal central axis, wherein the longitudinal central axis of the first end effector is aligned with the longitudinal central axis of the clamping head when the first end effector is received in the clamping head, and wherein the longitudinal central axis of the second end effector is aligned with the longitudinal central axis of the clamping head when the second end effector is received in the clamping head.

12. The system of claim 1, wherein the end effector comprises at least one of bits, lenses, pipettes, suction cups, blades, stamps, shears, electric discharge end effector, cutters, and nozzles.

13. The system of claim 1, wherein the end effector is configured for at least one of cutting, shaping, drilling, grasping, suctioning, layering of liquids, spraying, placing, viewing, curing, welding, engraving, ablation, extraction, and embossing.

14. The system of claim 1 comprising a 3D printing bed coupled to the platform.

15. The system of claim 1 wherein the platform comprises a milling plate.

16. The system of claim 1, wherein the compressing handle pivots about the pivot axis from an open position to receive the module in the clamping head to the closed position to secure the module in the clamping head.

17. The system of claim 16, wherein the compressing handle comprises
a first distance from the pivot axis to an outer surface of a first side of the clamping head when the compressing handle is in the open position,
a second distance from the pivot axis to the outer surface of the first side of the clamping head when the compressing handle is in the closed position, and
wherein the first distance is different from the second distance.

18. The system of claim 17, wherein the first distance is less than the second distance.

19. The system of claim 16, wherein the compressing handle comprises
an inner portion surrounded by an outer portion,
wherein the outer portion comprises a first thickness between the inner portion and an outer surface of a first side of the clamping head when the compressing handle is in the open position,
wherein the outer portion comprises a second thickness between the inner portion and an outer surface of the first side of the clamping head when the compressing handle is in the closed position, and
wherein the first thickness is less than the second thickness.

20. The system of claim 1, wherein the clamping head receives the module such that a longitudinal axis of the module extends vertically.

* * * * *